(12) United States Patent
Bandy

(10) Patent No.: US 10,947,957 B1
(45) Date of Patent: Mar. 16, 2021

(54) APPARATUS, SYSTEM AND METHOD FOR UTILIZING KINETIC ENERGY TO GENERATE ELECTRICITY

(71) Applicant: Keith G. Bandy, Modesto, CA (US)

(72) Inventor: Keith G. Bandy, Modesto, CA (US)

(*) Notice: Subject to any disclaimer, the term of this patent is extended or adjusted under 35 U.S.C. 154(b) by 0 days.

(21) Appl. No.: 17/070,700

(22) Filed: Oct. 14, 2020

Related U.S. Application Data

(63) Continuation-in-part of application No. 16/205,060, filed on Nov. 29, 2018, now abandoned.

(51) Int. Cl.

| | |
|---|---|
| *F03D 9/25* | (2016.01) |
| *H02S 10/12* | (2014.01) |
| *H02S 40/44* | (2014.01) |
| *F24S 60/30* | (2018.01) |
| *F03D 9/00* | (2016.01) |
| *F03G 3/08* | (2006.01) |
| *H02K 7/02* | (2006.01) |
| *H02K 7/108* | (2006.01) |
| *H02K 7/116* | (2006.01) |
| *H02K 7/18* | (2006.01) |

(52) U.S. Cl.
CPC ............... *F03D 9/25* (2016.05); *F03D 9/007* (2013.01); *F03G 3/08* (2013.01); *F24S 60/30* (2018.05); *H02K 7/02* (2013.01); *H02K 7/108* (2013.01); *H02K 7/116* (2013.01); *H02K 7/183* (2013.01); *H02S 10/12* (2014.12); *H02S 40/44* (2014.12); *F05B 2220/706* (2013.01); *F05B 2220/708* (2013.01)

(58) Field of Classification Search
CPC . F03D 9/25; F03D 9/007; H02S 10/12; H02S 40/44; F24S 60/30; H02K 7/116; H02K 7/02; H02K 7/183; H02K 7/108; F03G 3/08; F05B 2220/708; F05B 2220/706
See application file for complete search history.

(56) References Cited

U.S. PATENT DOCUMENTS

| | | | | |
|---|---|---|---|---|
| 695,524 | A * | 3/1902 | Woodell | F03D 9/39 290/55 |
| 1,112,203 | A * | 9/1914 | Fandrey | F03D 9/35 415/4.4 |
| 3,902,072 | A * | 8/1975 | Quinn | F03D 3/068 290/44 |

(Continued)

*Primary Examiner* — Tulsidas C Patel
*Assistant Examiner* — Joseph Ortega
(74) *Attorney, Agent, or Firm* — Richard A. Ryan

(57) ABSTRACT

An apparatus, system and method for generating electricity using stored kinetic energy of a flywheel. The apparatus has a generating mechanism, an air passageway, a heating chamber and a heating mechanism. A wind turbine rotates a drive shaft and a pair of flywheels that are independently and selectively rotated by the drive shaft. Input air flowing in the passageway rotates the wind turbine. While one flywheel rotates with the drive shaft to build up kinetic energy, the other flywheel rotates free of the drive shaft to use kinetic energy to drive an output shaft and generate electricity. A heat exchanger heats air in the heating chamber to produce convective air flow to draw input air through the passageway. A thermal energy storage tank stores heat for the heat exchanger. The system includes a source of electricity to power a pump. The method uses the apparatus to produce electricity.

20 Claims, 6 Drawing Sheets

(56) References Cited

U.S. PATENT DOCUMENTS

| | | | | |
|---|---|---|---|---|
| 3,936,652 | A * | 2/1976 | Levine | F03D 15/10 290/2 |
| 4,031,173 | A * | 6/1977 | Rogers | F03D 13/20 261/24 |
| 4,036,916 | A * | 7/1977 | Agsten | F03D 9/25 261/109 |
| 4,070,131 | A * | 1/1978 | Yen | F03D 1/04 415/4.4 |
| 4,433,544 | A * | 2/1984 | Wells | F03D 3/04 60/641.12 |
| 4,452,562 | A * | 6/1984 | Hsu | F03D 1/04 415/208.1 |
| 4,779,006 | A * | 10/1988 | Wortham | F03G 6/06 290/55 |
| 4,935,639 | A * | 6/1990 | Yeh | F03D 9/39 290/55 |
| 5,300,817 | A * | 4/1994 | Baird | F03D 9/007 290/55 |
| 5,395,598 | A * | 3/1995 | Prueitt | B01D 53/14 422/168 |
| 6,590,300 | B1 * | 7/2003 | Preito Santiago | F03D 1/04 290/55 |
| 6,772,593 | B2 * | 8/2004 | Dunn | F03G 6/045 60/641.11 |
| 6,981,839 | B2 * | 1/2006 | Fan | F03D 3/002 415/4.1 |
| 7,154,190 | B2 * | 12/2006 | Kaploun | F03D 9/25 290/43 |
| 7,632,040 | B2 * | 12/2009 | Cripps | F03B 13/00 405/75 |
| 7,821,151 | B2 * | 10/2010 | Le | F03G 6/045 290/55 |
| 8,128,337 | B2 * | 3/2012 | Pezaris | F03D 9/25 415/4.2 |
| 8,338,977 | B2 * | 12/2012 | Lee | H02S 10/12 290/44 |
| 8,459,930 | B2 * | 6/2013 | Krippene | F03D 9/34 415/4.2 |
| 8,664,781 | B2 * | 3/2014 | Alvi | F03D 1/04 290/1 R |
| 9,062,896 | B2 * | 6/2015 | Nix | F24S 23/79 |
| 9,103,324 | B2 * | 8/2015 | Son | F03D 9/25 |
| 9,334,853 | B2 * | 5/2016 | Hollick | H02S 40/44 |
| 9,574,551 | B2 | 2/2017 | Parrella, Sr. et al. | |
| 9,708,978 | B2 * | 7/2017 | Johnson | F02C 6/18 |
| 9,932,970 | B1 * | 4/2018 | Jeter | C02F 1/16 |
| 9,997,978 | B2 * | 6/2018 | Hovakimian | F03D 9/00 |
| 10,280,900 | B1 * | 5/2019 | Krippene | F03D 9/45 |
| 10,648,458 | B2 * | 5/2020 | Nix | F03G 6/04 |
| 10,876,519 | B1 * | 12/2020 | Chaapel | F03D 1/0633 |
| 2002/0162329 | A1 * | 11/2002 | Dunn | F03D 9/007 60/641.8 |
| 2004/0211184 | A1 * | 10/2004 | Bharathan | F28B 1/06 60/651 |
| 2004/0245877 | A1 * | 12/2004 | Khalizadeh | F16F 15/315 310/113 |
| 2006/0016182 | A1 * | 1/2006 | Comandu | F03G 6/045 60/398 |
| 2006/0125241 | A1 * | 6/2006 | DuHamel | F03D 9/25 290/44 |
| 2009/0120091 | A1 * | 5/2009 | DuBois | F03D 9/39 60/641.3 |
| 2010/0109337 | A1 * | 5/2010 | Wang | F03D 80/30 290/55 |
| 2010/0275598 | A1 * | 11/2010 | Raffaele | F02C 1/05 60/641.8 |
| 2010/0276943 | A1 * | 11/2010 | Tianchon | H02K 53/00 290/1 C |
| 2011/0021134 | A1 * | 1/2011 | Zwern | F24S 20/66 454/343 |
| 2012/0037152 | A9 * | 2/2012 | Nix | F24S 23/79 126/686 |
| 2012/0125020 | A1 * | 5/2012 | Vandermeulen | H02S 20/00 62/94 |
| 2013/0049375 | A1 * | 2/2013 | Burton | F01D 1/32 290/40 A |
| 2013/0257055 | A1 * | 10/2013 | Simpson | F03D 3/00 290/52 |
| 2013/0277971 | A1 * | 10/2013 | Cho | H02P 9/04 290/44 |
| 2013/0341934 | A1 * | 12/2013 | Kawanishi | B61D 43/00 290/1 A |
| 2014/0298807 | A1 * | 10/2014 | Villarrubia Ruiz | F02C 7/08 60/641.13 |
| 2015/0089946 | A1 * | 4/2015 | Dofredo | F03D 9/17 60/641.12 |
| 2015/0204206 | A1 * | 7/2015 | Seo | H02K 7/1823 290/52 |
| 2016/0123331 | A1 * | 5/2016 | Nix | F03D 9/007 417/335 |
| 2018/0363623 | A1 * | 12/2018 | Barlot | F03D 9/25 |
| 2020/0271036 | A1 * | 8/2020 | Warren | F24H 1/208 |
| 2020/0403479 | A1 * | 12/2020 | Bergan | H02K 7/04 |

* cited by examiner

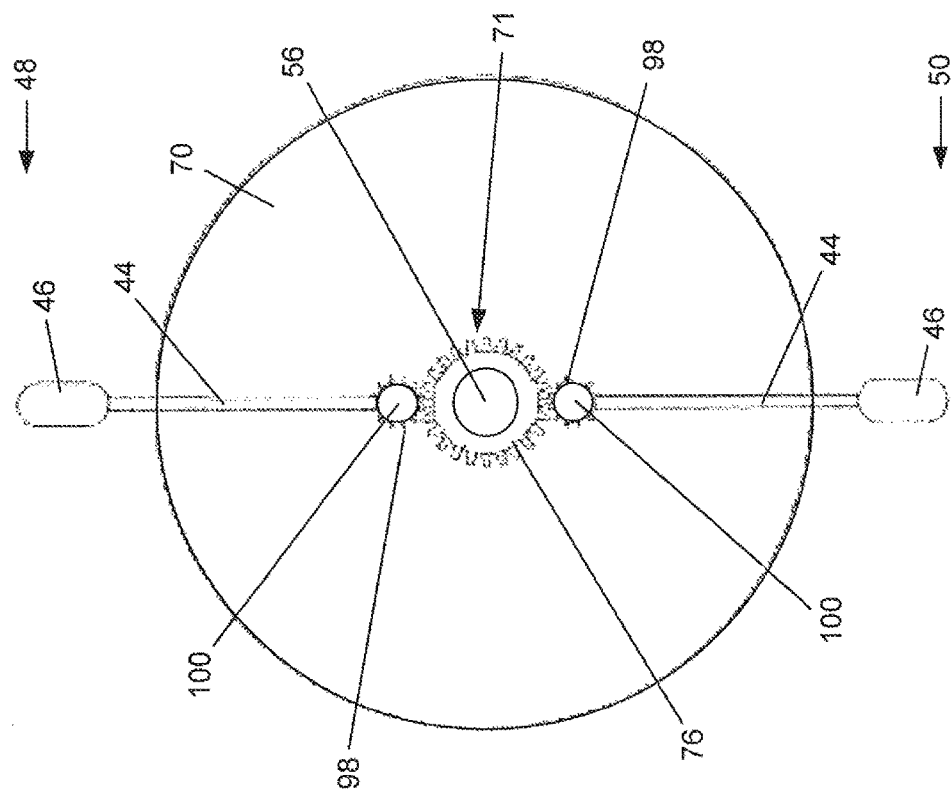
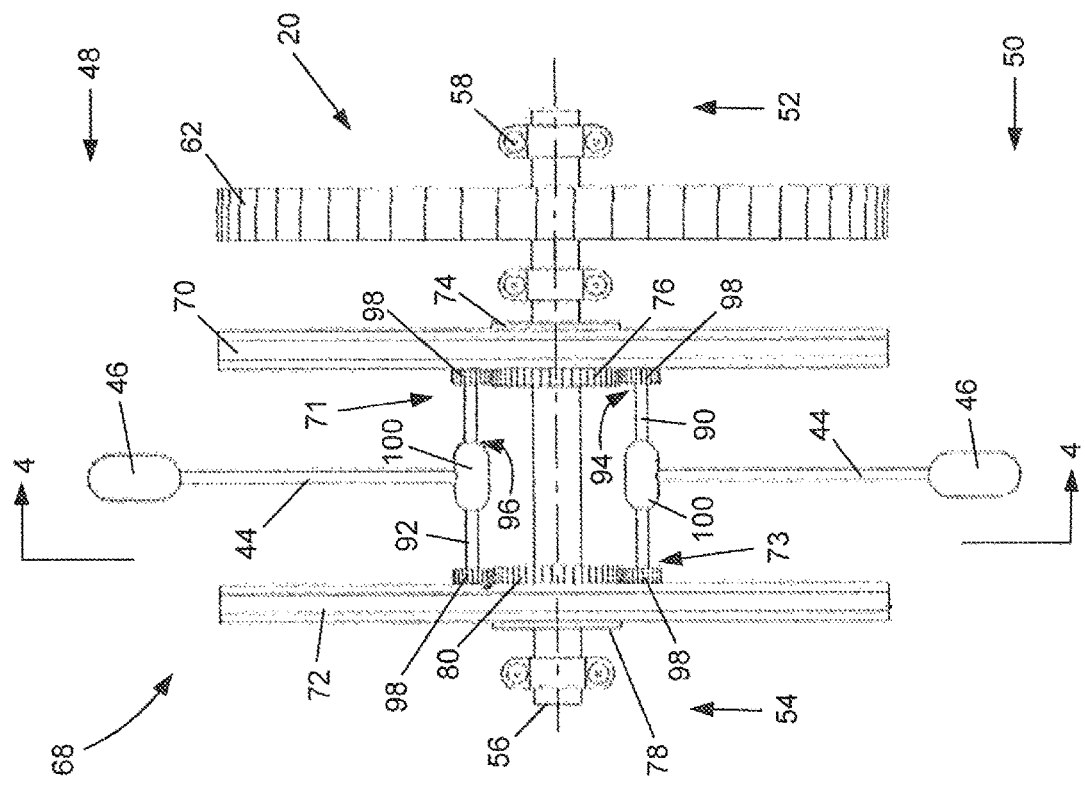

PROVIDING AN APPARATUS 10 COMPRISING A GENERATING ASSEMBLY 16 AND AN UPDRAFT ASSEMBLY 18, WITH THE GENERATING ASSEMBLY 16 HAVING A GENERATING MECHANISM 20 AND AN AIR PASSAGEWAY 22 THROUGH WHICH FLOWS INPUT AIR 24, THE GENERATING MECHANISM HAVING A WIND TURBINE 62, A MAIN DRIVE SHAFT 56, A FLYWHEEL ASSEMBLY 68, AN OUTPUT SHAFT 44 CONNECTED TO THE FLYWHEEL ASSEMBLY 68 AND AN ELECTRICAL GENERATOR 46 OPERATIVELY CONNECTED TO THE OUTPUT SHAFT 44, THE FLYWHEEL ASSEMBLY 68 HAVING A FIRST FLYWHEEL 70, A FIRST GEAR/CLUTCH ASSEMBLY 71 ASSOCIATED WITH THE FIRST FLYWHEEL 70, A SECOND FLYWHEEL 72, A SECOND GEAR/CLUTCH ASSEMBLY 73 ASSOCIATED WITH THE SECOND FLYWHEEL 72 AND A GEARBOX 100 THAT IS STRUCTURED AND ARRANGED TO INTERCONNECT THE FIRST GEAR/CLUTCH ASSEMBLY 71 AND THE SECOND GEAR/CLUTCH ASSEMBLY 73 WITH THE OUTPUT SHAFT 44, THE UPDRAFT ASSEMBLY 18 HAVING A HEATING MECHANISM 30 WITH A HEAT EXCHANGER 116 DISPOSED INSIDE A CHAMBER INTERIOR 36 OF A HEATING CHAMBER 32, THE HEAT EXCHANGER 116 COMPRISING A HEATED FLUID 120 FLOWING IN A CLOSED-LOOP PIPING SYSTEM 118.

→

HEATING THE HEATED FLUID 120 IN THE CLOSED-LOOP PIPING SYSTEM 118 WITH A SOURCE OF HEAT 122.

→

FLOWING THE HEATED FLUID 120 IN THE CLOSED-LOOP PIPING SYSTEM 118 THROUGH THE CHAMBER INTERIOR 36 OF THE HEATING CHAMBER 32 TO HEAT MIXED AIR 42 IN THE CHAMBER INTERIOR 36 TO PRODUCE HEATED AIR 34 THAT FLOWS UPWARD TO PRODUCE A CONVECTIVE FORCE WHICH DRAWS IN INPUT AIR 24 INTO THE AIR PASSAGEWAY 22.

→

ROTATING THE WIND TURBINE 62 OF THE GENERATING MECHANISM 20 WITH THE INPUT AIR 24 FLOWING IN THE AIR PASSAGEWAY 22 TO ROTATE THE MAIN DRIVE SHAFT 56 ATTACHED TO OR INTEGRAL WITH THE WIND TURBINE 62.

→

ENGAGING THE FIRST GEAR/CLUTCH ASSEMBLY 71 TO PLACE THE FIRST FLYWHEEL 70 IN AN ENGAGED CONDITION 82 AND TO BE OPERATIVELY DISCONNECTED FROM THE OUTPUT SHAFT 44 SO AS TO ROTATE THE FIRST FLYWHEEL 70 WITH THE MAIN DRIVE SHAFT 56 TO BUILD UP KINETIC ENERGY IN THE FIRST FLYWHEEL 70 WHILE THE SECOND FLYWHEEL 72 IS IN A DISENGAGED CONDITION 88 AND OPERATIVELY CONNECTED TO THE OUTPUT SHAFT 44 WITH THE SECOND GEAR/CLUTCH ASSEMBLY 73 ALLOWING THE SECOND FLYWHEEL 72 TO ROTATE INDEPENDENT OF THE MAIN DRIVE SHAFT 56 SO AS TO UTILIZE KINETIC ENERGY OF THE SECOND FLYWHEEL 72 TO ROTATE THE OUTPUT SHAFT 44 TO PRODUCE ELECTRICITY AT THE ELECTRICAL GENERATOR 46.

→

OPERATING THE FIRST GEAR/CLUTCH ASSEMBLY 71 TO PLACE THE FIRST FLYWHEEL 70 IN A DISENGAGED CONDITION 84 AND TO BE OPERATIVELY CONNECTED TO THE OUTPUT SHAFT 44 TO ALLOW THE FIRST FLYWHEEL 70 TO ROTATE INDEPENDENT FROM THE MAIN DRIVE SHAFT 56 SUCH THAT KINETIC ENERGY ASSOCIATED WITH ROTATION OF THE FIRST FLYWHEEL 70 WILL ROTATE THE OUTPUT SHAFT 56 TO PRODUCE ELECTRICITY AT THE ELECTRICAL GENERATOR 46 WHILE OPERATING THE SECOND GEAR/CLUTCH ASSEMBLY 73 TO PLACE THE SECOND FLYWHEEL 72 IN AN ENGAGED CONDITION 86 AND TO BE OPERATIVELY DISCONNECTED FROM THE OUTPUT SHAFT 44 SO AS TO ROTATE THE SECOND FLYWHEEL 72 WITH THE MAIN DRIVE SHAFT 56 TO BUILD-UP KINETIC ENERGY IN THE SECOND FLYWHEEL 72.

FIG. 7

APPARATUS, SYSTEM AND METHOD FOR UTILIZING KINETIC ENERGY TO GENERATE ELECTRICITY

CROSS-REFERENCE TO RELATED APPLICATIONS

This patent application is a continuation-in-part of U.S. patent application Ser. No. 16/205,060 filed Nov. 29, 2018.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses, systems and methods for producing rotational torque through an output shaft so the rotating shaft may be utilized to generate electricity. More particularly, the present invention relates to such apparatuses, systems and methods that utilize moving air to rotate a wind turbine to drive an output shaft which is connected to a generator to generate electricity. Even more particularly, the present invention relates to such apparatuses, systems and methods that do not rely on natural occurring wind to rotate the wind turbine and which utilize kinetic energy from a rotating flywheel driven by the wind turbine to beneficially rotate an output shaft that is connected to a generator to produce electricity.

B. Background

Motors and other machines for converting a source of input energy to an output in the form of rotational torque that is delivered through an output shaft have been generally available for many years. The rotational torque at the output shaft is commonly utilized to produce electricity via a generator or power a pump, grinding wheel or other machine, turn a wheel and operate other devices. The input energy for such machines has been provided by people, animals, moving water, gravity, blowing wind, fossil fuels, nuclear materials and a variety of other sources. Over the years, there has been a desire to have machines which utilize energy from readily available, clean and renewable sources, such as water, wind or the sun, instead of using the limited and more polluting sources of energy, such as petroleum, natural gas, coal, uranium and the like. With regard to machines which use the power of moving water or wind, these machines are generally configured to result in a force differential, provided by the force of the moving water or wind, on opposite sides of the machine's wheel or fan blades in order to rotate a shaft that is fixedly connected to the wheel or fan blades. The ideal configuration for such machines is to have as much of a force imbalance as possible on opposite sides of the wheel or fan blades so that the machine will generate the maximum amount of rotational torque at the output shaft. In general, the various components of these water or wind powered machines are beneficially shaped and configured in an attempt to achieve this objective.

With regard to generating electricity, various apparatuses, systems and methods for converting a source of energy to useful power for generating electricity have been generally available for many years. A common arrangement for generating electricity is a large power plant that delivers the produced electricity to the end user over a long distance, often very long distance, by way of a power grid comprising numerous transmission lines. Presently, most large power plants rely on traditional sources of energy, such as oil, natural gas, coal, nuclear, stored water and the like to operate generators which produce electricity. There is a strong effort to provide alternative apparatuses and systems to power machines, particularly generators for producing electricity, that utilize energy sources which have less environmental impact, generally by being more readily available, cleaner and, preferably, renewable. For instance, many people and organizations have been attempting to utilize wind, solar, tidal and geothermal resources as a source of power to operate generators for the production of electricity. Although such sources of energy have been well known and, to some extent, in use for many years, it has only been relatively recent that substantially increased efforts have been directed towards improving the efficiency and availability of such energy systems so they can be utilized to generate a greater amount of society's electricity needs. Currently, however, such alternative energy systems are a relatively small percentage of the total electricity production.

In general, the increased push for apparatuses and systems that generate electricity without utilizing conventional, non-renewable and polluting energy sources is a direct result of an increase in the number of devices which are powered by electricity, such as computers, air conditioning, vehicles, audio systems, kitchen appliances and a vast number of other devices, and the rapid expansion in the number of people who desire to utilize such devices. As is well known in the art, the increase in the supply of electricity to meet this demand will have to be supplied by those apparatuses and systems that are available, which, at least presently, primarily rely on hydrocarbon-based fuels. In general, as the need for electricity increases, the supply of fuel to produce electricity is further reduced, the environmental impacts of utilizing certain fuels worsen and the cost of using electricity increases. Presently, most experts expect that the demand for electricity will substantially increase during the foreseeable future. In addition, consumers generally expect that electricity will be available to them when they need it, whether to operate an appliance, energize a light source, operate a machine, provide power to operate motor vehicles and other uses.

With regard to wind-driven generating apparatuses and systems, the most common type are those which utilize a wind "propeller" configuration having a horizontally disposed rotational axis around which a plurality of propellor vanes rotate in response to blowing wind. These types of wind energy machines, also referred to as windmills and horizontal axis wind turbines, are commonly utilized throughout the world. One limitation of these machines is that the horizontal axis through the propeller must face in the direction from which the wind originates, which requires the machine to rotate the propeller so that it is always facing into the wind. Generally, this results in somewhat complicated machinery that requires relatively high maintenance costs. Another type of wind-driven generating apparatus is commonly referred to as a vertical axis wind energy machine.

These machines have a plurality of flat surfaces which rotate around a vertically disposed rotational axis in response to blowing wind. One advantage of vertical axis wind machines, compared to horizontal axis wind machines, is that they are generally self-aligning in that they do not need to be directed into the wind, as they will rotate around the center axis no matter which direction the wind originates.

A problem common with conventional horizontal and vertical axis wind energy machines is that they both require naturally occurring blowing wind, which availability is well known to be subject to the whims of nature. Likewise modern energy production apparatuses and systems that rely exclusively on solar radiation, moving water and the like for operating a generator to directly produce electricity are subject to the availability of such resources. As is well known, such systems are not able to produce electricity, or at least not at the desired scale, if the energy basis for rotating the output shaft is not available or not fully available. In addition, these and other prior art clean energy production systems, such as geothermal or tidal energy systems, generally require the physical facilities to be placed in or very near certain geographical and/or topographical locations or where certain weather conditions (i.e., sunshine, wind or the like) are mostly available. In addition, many of the prior art clean energy production systems require significant above-ground facilities that are often considered to be unsightly, expensive and cause other types of environmental harm, particularly with regard to tall wind turbines, large dams and the like. Geothermal energy production systems and the like require facilities that are configured to handle the high heat and high pressure of the steam which is necessary for the systems to operate.

What is needed, therefore, is an improved apparatus for producing rotational torque that is utilized to generate electricity and improved systems and methods of producing rotational torque for generating electricity that utilizes such apparatuses. The new apparatus should be configured to rotate a shaft that is operatively connected to an electrical generator to generate electricity in a manner which does not rely on petroleum, nuclear and other non-renewable and potentially polluting and dangerous energy resources. Although the new apparatus should be configured to more cleanly produce electricity, the apparatus should be configured such that it is not subject to the whims of nature with regard to the availability of solar radiation, blowing wind, moving water, geothermal-produced steam and the like in order to produce the desired amount of electricity or be limited to certain geographical or topographical areas. Preferably, the new apparatus, system and method should be configured to efficiently produce electricity and have operating components that do not require a significant level of ongoing maintenance to produce the rotational torque which operates a generator to produce electricity.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be utilized by itself or any combination of two or more of the listed items can be utilized together.

The apparatus, system and method of the present invention provides the benefits and solves the problems identified above. That is to say, the new apparatus, system and method of the present invention is generally configured to produce rotational torque at an output shaft which is utilized to operate a generator to generate electricity in a manner which does not rely on petroleum, nuclear and other non-renewable and potentially polluting and dangerous energy resources. In addition, unlike most other clean energy systems, the new apparatus, system and method of the present invention are not subject to the whims of nature with regard to the availability of solar radiation, blowing wind, moving water, geothermal source and the like in order to produce electricity. In the preferred configurations of the present invention, the new apparatus, system and method for producing electricity utilizes moving air from a thermally-based air updraft assembly to rotate a wind turbine that is attached to a flywheel drive shaft to rotate a flywheel and a clutch and gear assembly associated with the flywheel to repeatedly engage and disengage the flywheel from the flywheel drive shaft to build up kinetic energy and, when disengaged, to allow kinetic energy of the rotating flywheel to, via a gearbox, rotate an output shaft which is connected to a generator to generate electricity. The new apparatus, system and method will efficiently produce electricity in a manner that does not require significant ongoing maintenance.

The present invention is an eco-friendly apparatus, system and method for producing utility-scale electricity. Because the present invention does not need high pressure steam to operate, there is no need for expensive steam turbines. In addition, because the invention does not rely solely on solar, wind or geothermal energy, the apparatus and system do not need to be placed at any particular geographical location or at an area having frequently available weather conditions, such as being sunny, windy, near water or the like. In one embodiment of the present invention, mineral oil or other heat-retaining liquid from one or more thermal energy storage tanks is circulated through a closed circuit piping network in a heat exchanger that is located in a chamber, which may placed underground and have an inverted funnel-shape, with a chimney-like small-sized top end that is disposed upward. As the air inside the chamber is heated by the heat exchanger it expands and flows out the small top end due to the stack effect. Air flowing out of the chamber draws input air into the chamber through an opening at the bottom of the chamber that is connected to a passageway that brings outside input air to the chamber. The air flowing in the passageway passes through a paddlewheel-like wind turbine that drives a pair of large, weighted flywheels on a main drive shaft connected to the wind turbine. Both of the flywheels are connected, via a specially configured gear/clutch mechanism, to one more output shafts that are each operatively connected to an electric generator. The gear/clutch mechanism is configured to selectively disengage one flywheel at a time from the main drive shaft after the flywheel is brought up to a desired rotational speed. The kinetic energy stored by the disengaged, rotating flywheel will rotate the output shaft of each generator to generate electricity. When the rotating flywheel begins to slow down due to losses associated with generating electricity, the gear/clutch mechanism associated with that flywheel will re-engage the flywheel and the gear/clutch mechanism associated with the other flywheel will disengage to allow the kinetic energy built-up in that flywheel to produce electricity. This process of rotating flywheels and engaging and disengaging the flywheels from the main drive shaft continuously repeats as air flows through the passage way, where the flowing air rotates the wind turbine, and out the small end of the updraft assembly (as heated air). The heat-retaining liquid in the piping network is heated (re-heated) by heat transfer material, which may be the same heat-retaining liquid that is stored in the thermal energy storage tank, as the piping network passes through the thermal energy storage tank. The heat-retaining liquid in the thermal energy storage tank is heated using solar panels, parabolic trough solar collectors, electric or gas-powered heaters or the like. In one embodiment, the heat transfer material may be heated air by flowing through a system of solar thermal panels. The air in the passageway may be forced air from an electric pump. Any electric pumps and/or heaters may be powered by a separate electrical power system having standard photovoltaic solar panels, wind turbines or the like.

In one embodiment of the present invention, the new apparatus generally comprises a generating assembly and an updraft assembly that function together to generate electricity in an efficient and environmentally friendly manner. The generating assembly has a generating mechanism and an air passageway, with the air passageway configured to receive input air at a passageway inlet and to flow the input air through the air passageway so as to discharge the input air therefrom at a passageway outlet. The generating mechanism has a wind turbine that is positioned in the air passageway so as to be rotated by the input air flowing through the air passageway, a main drive shaft attached to or integral with the wind turbine so as to be rotated thereby, a flywheel assembly supported by the main drive shaft, an output shaft connected to the flywheel assembly so as to be rotated thereby and an electrical generator operatively connected to the output shaft. The flywheel assembly is structured and arranged such that when a first flywheel or a second flywheel is engaged with and rotated by the main drive shaft to build up kinetic energy, the other flywheel is allowed to rotate independent of the main drive shaft while expending its previously built-up kinetic energy. The flywheel assembly is structured and arranged to rotate the output shaft as a result of the independent rotation (kinetic energy) of either the first flywheel or the second flywheel so as to generate electricity at the electrical generator. The updraft assembly has a heating chamber and a heating mechanism that is disposed in a chamber interior of the heating chamber. The heating chamber has a chamber inlet in fluid flow communication with the passageway outlet so as to receive input air into the chamber interior to produce mixed air (combination of input air and previously or partially heated air) in the chamber interior. The heating mechanism is structured and arranged to heat the mixed air in the chamber interior to produce heated air that will flow out of the heating chamber through a chamber outlet. In operation, the heated air flowing from the heating chamber produces vertical convective air flow that draws input air into the air passageway at the passageway input, flows the input air through the air passageway to rotate the wind turbine to operate the flywheel assembly so as to produce electricity at the electrical generator due to the independent rotation of either the first flywheel or the second flywheel and to discharge input air into the chamber interior to produce the mixed air that is heated by the heating mechanism to produce heated air that flows from the heating chamber.

In the preferred configuration, the flywheel assembly further comprises a first gear/clutch assembly that is operatively associated with the first flywheel, a second gear/clutch assembly which is operatively associated with the second flywheel and a gearbox that is structured and arranged to interconnect the first gear/clutch assembly and the second gear/clutch assembly with the output shaft. The first gear/clutch assembly is structured and arranged to selectively place the first flywheel in an engaged condition to rotate the first flywheel with the main drive shaft and a disengaged condition to allow the first flywheel to rotate independently of the main drive shaft. The second gear/clutch assembly is structured and arranged to selectively place the second flywheel in an engaged condition to rotate the second flywheel with the main drive shaft and a disengaged condition to allow the second flywheel to rotate independently of the main drive shaft. The gearbox is structured and arranged to rotate the output shaft when the first flywheel or second flywheel is in their disengaged condition. The first gear/clutch assembly has a first clutch mechanism operatively associated with the first flywheel to place the first flywheel in one of the engaged condition and the disengaged condition, a first main gear ring attached to or integral with the first flywheel so as to rotate therewith, a secondary gear ring in engagement relation with the first main gear ring and a first gear drive shaft attached to or integral with the secondary gear ring. The second gear/clutch assembly has a second clutch mechanism operatively associated with the second flywheel so as to place the second flywheel in one of the engaged condition and the disengaged condition, a second main gear ring attached to or integral with the second flywheel so as to rotate therewith, a secondary gear ring in engagement relation with the second main gear ring and a second gear drive shaft attached to or integral with the secondary gear ring. Each of the of the first gear drive shaft and the second gear drive shaft are operatively connected to the gearbox such that either gear drive shaft can rotate the output shaft. In one embodiment, the apparatus has a plurality of the output shafts connected to the flywheel assembly, with each of the output shafts operatively connected to an electrical generator to produce electricity.

The heating mechanism comprises a heat exchanger having a closed-loop piping system containing a heated fluid that is heated by a source of heat, with the closed-loop piping system being configured to heat the mixed air that is in the chamber interior to produce the heated air. The source of heat comprises at least one of a thermal energy storage tank and a heater, with the thermal energy storage tank containing a heat-retaining liquid that is heated by fluid heating mechanism. In a preferred configuration, the heat-retaining liquid is selected to heat the heated fluid as the closed-loop piping system passes through the thermal energy storage tank. The fluid heating mechanism can comprise one or more solar panels that are directly associated with the thermal energy storage tank and/or one or more solar collectors, such as parabolic trough solar collectors, in fluid flow communication with the heat-retaining liquid in the thermal energy storage tank. The apparatus can include a tank piping system that is configured to flow the heat-retaining liquid from the one or more solar collectors for heating and to return the heat-retaining liquid to the thermal energy storage tank for heating the heated fluid in the closed-loop piping system. In the preferred embodiments, the updraft assembly further comprises an updraft tower at the chamber outlet, with the updraft tower having a chimney-like piping configured to transfer heated air from the chamber outlet to an exhaust port associated with the updraft tower to better facilitate the exit of heated air from the heating chamber to better draw input air into the air passageway. The apparatus can a forced air device at the passageway inlet to direct input air into the air passageway.

In one embodiment of the system of the present invention, the new system for generating electricity generally comprises the above-described apparatus and a pump that is electrically connected to a source of electricity to pump the heated fluid through the closed-loop piping system and at least a power plant transformer to receive the electricity produced by the electrical generators and a power grid to transfer electricity to end users.

In one embodiment of the method of the present invention, the new method for generating electricity generally comprises the steps of: (a) providing an apparatus having a generating assembly and an updraft assembly as described above; (b) heating the heated fluid in the closed-loop piping system with the source of heat; (c) flowing the heated fluid in the closed-loop piping system through the chamber interior of the heating chamber to heat mixed air in the chamber interior to produce heated air that flows upward to produce a convective force which draws in input air into the air passageway; (d) rotating the wind turbine of the generating mechanism with the input air flowing in the air passageway to rotate the main drive shaft attached to or integral with the wind turbine; (e) engaging the first flywheel with the first gear/clutch assembly to place the first flywheel in an engaged condition in which it is operatively disconnected from the output shaft so as to rotate the first flywheel with the main drive shaft to build up kinetic energy in the first flywheel while the second flywheel is in a disengaged condition and operatively connected to the output shaft with the second gear/clutch assembly allowing the second flywheel to rotate independent of the main drive shaft so as to utilize kinetic energy of the second flywheel to rotate the output shaft to produce electricity at the electrical generator; and (f) operating the first gear/clutch assembly to place the first flywheel in a disengaged condition in which it is operatively connected to the output shaft to allow the first flywheel to rotate independent of the main drive shaft such that kinetic energy associated with rotation of the first flywheel will rotate the output shaft to produce electricity at the electrical generator while operating the second gear/clutch assembly to place the second flywheel in an engaged condition in which it is operatively disconnected from the output shaft to rotate the second flywheel with the main drive shaft to build-up kinetic energy in the second flywheel. The operation of the first gear/clutch assembly and the second gear/clutch assembly are repeatedly reversed to use the kinetic of one flywheel to rotate the output shaft and to build-up kinetic energy in the other flywheel.

Accordingly, the primary object of the present invention is to provide a new apparatus, system and method for producing rotational torque that is utilized for producing electricity having the various advantages set forth above and which overcomes the various disadvantages and limitations associated with presently available apparatuses, systems and methods to produce rotational torque utilized for electricity production.

It is an important object of the present invention to provide a new apparatus, system and method of producing rotational torque that is structured and arranged to utilize the force of moving air to rotate a wind turbine which rotates a flywheel that is then disengaged from its drive shaft to kinetically drive an output shaft connected to an electrical generator to generate electricity.

An important aspect of the present invention is that it provides a new apparatus, system and method for generating electricity that accomplishes the objectives set forth above.

Another important aspect of the present invention is that it provides a new apparatus, system and method which produces rotational torque at an output shaft to generate electricity in a manner which does not rely on petroleum, nuclear and other non-renewable, polluting and potentially dangerous energy resources, is not subject to the whims of nature with regard to the availability of solar radiation, blowing wind, moving water, geothermal source and the like, and does not require being located at or near certain geographical or topographical features.

Another important aspect of the present invention is that it provides a new apparatus, system and method for producing electricity which utilizes a thermally-based air updraft assembly to draw air through a passageway to rotate a wind turbine that is positioned in the passageway to rotate an output shaft, by way of a specially configured flywheel assembly, which drives an electric generator.

Another important aspect of the present invention is that it provides a new apparatus, system and method for producing electricity which utilizes moving air derived from a thermally-based air updraft assembly to rotate a wind turbine that is attached to a flywheel drive shaft which rotates a flywheel with a clutch/gear assembly associated with the flywheel to disengage the flywheel from the flywheel drive shaft in order to allow kinetic energy built-up by the rotating flywheel to, via a gearbox, rotate an output shaft which is operatively connected to a generator to generate electricity.

Another important aspect of the present invention is that it provides a new apparatus, system and method for producing electricity in which much of the apparatus and system can be built underground or in facilities that are not as visually offensive as many prior art electricity generating systems.

Yet another important aspect of the present invention is that it provides a new apparatus, system and method for producing electricity which is structured and arranged to efficiently produce the electricity in a manner that does not require significant ongoing maintenance.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 3 is a top view of the generating assembly of the apparatus of FIGS. 1 and 2;

FIG. 4 is a sectional end view of the second end of the generating assembly of FIG. 3 taken through lines 4-4 of FIG. 3;

FIG. 7 is a flow chart illustrating the method of the present invention to generate electricity.

DETAILED DESCRIPTION OF THE PREFERRED EMBODIMENTS

Figure 1:
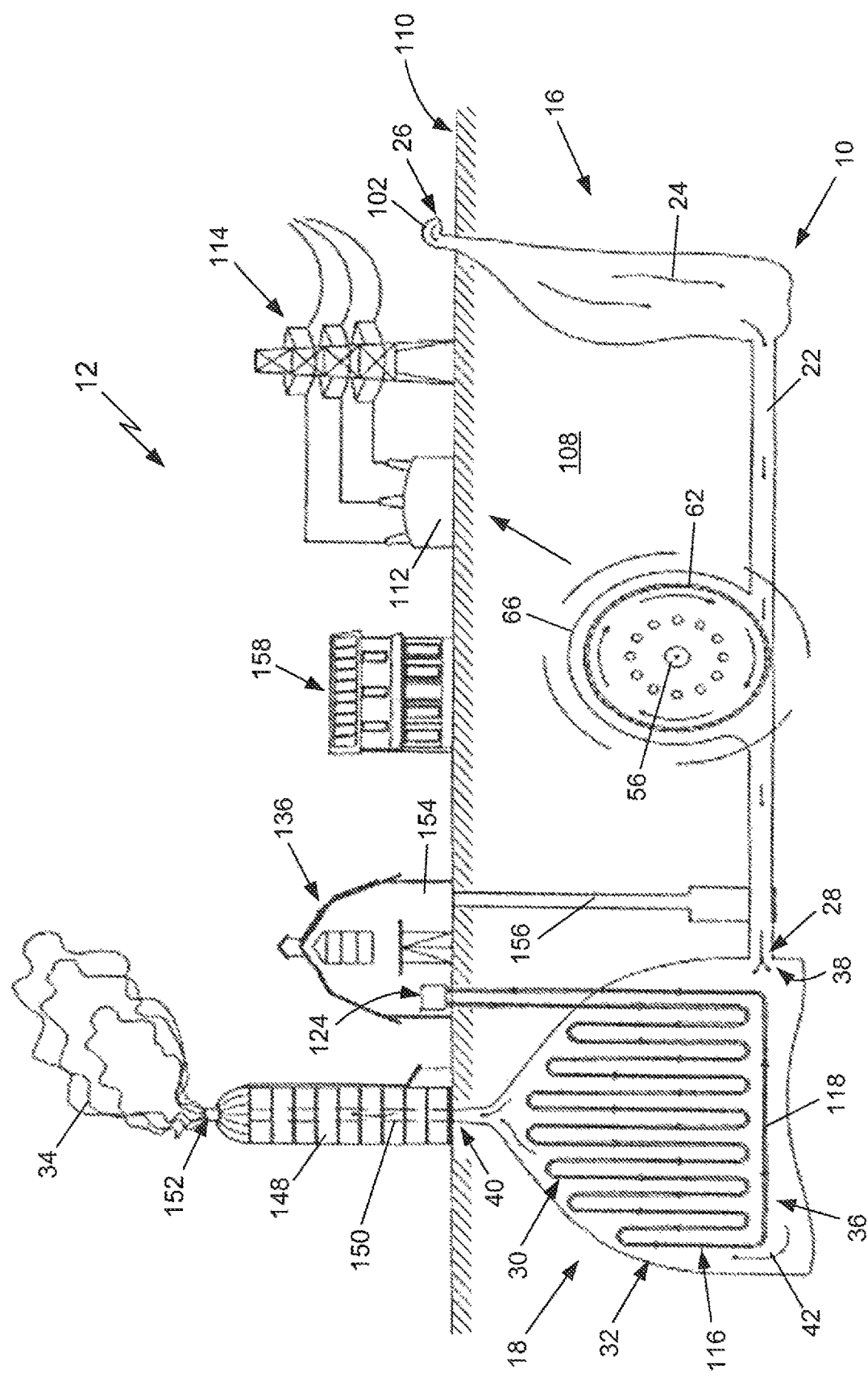
FIG. 1 is an illustration of a system for generating electricity that is configured according to a first embodiment of the present invention, with the apparatus thereof shown located underground.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for the new apparatus, system and method for generating electricity, persons who are skilled in the related art will readily appreciate that the present invention is not so limited. In addition, the exemplary embodiments of the apparatus, system and method of the present invention are shown and described herein with only those components which are required to disclose the present invention. Many of the necessary components for manufacturing, using, attaching to or otherwise benefitting from the present invention are not shown in the drawings or necessarily described below, but which are well known to persons who are skilled in the relevant art. As will be readily appreciated by such persons, the various elements of the present invention that are described below may take on any form which are consistent with forms that are readily realized by a person of ordinary skill in the art having knowledge of electrical generating apparatuses, systems and methods, particularly electrical generating systems and methods using wind-driven energy to rotate an output shaft which is operatively connected to an electrical generator.

Figure 2:
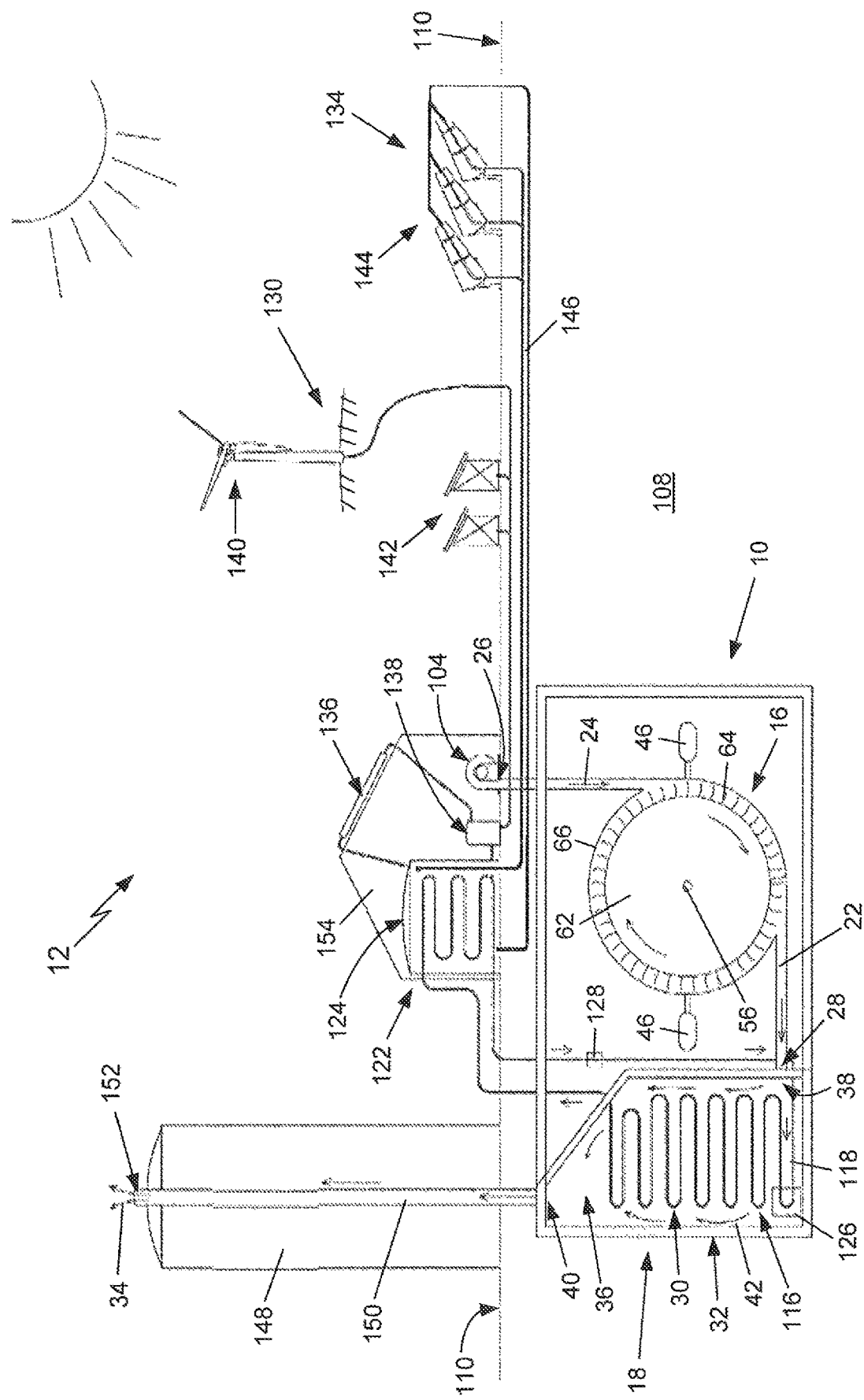
FIG. 2 is an illustration of a system for generating electricity that is configured according to a second embodiment of the present invention, with the apparatus thereof shown located underground.

An apparatus for producing electricity that is configured pursuant to one or more preferred embodiments of the present invention is shown generally as 10 in FIGS. 1-2. A system for producing electricity from rotational torque produced by the new apparatus 10 is shown as 12 in FIGS. 1-2 and 6. A new method for producing electricity using the new apparatus 10 and system 12 is shown as 14 in FIG. 7. As set forth in more detail below, the apparatus 10 of the present invention is structured and arranged to provide rotational torque that is utilized to generate electricity. The system 12 and method 14 for producing electricity of the present invention utilize the apparatus 10 and, as described below, a number of various other components to efficiently and effectively produce the rotational torque that is necessary to produce electricity. As will be readily appreciated by persons who are skilled in the art, the components of the apparatus 10 may be selected so as to be of a size and configuration that allows the present invention to be utilized for localized or large-scale generation of electricity.

Figure 5:
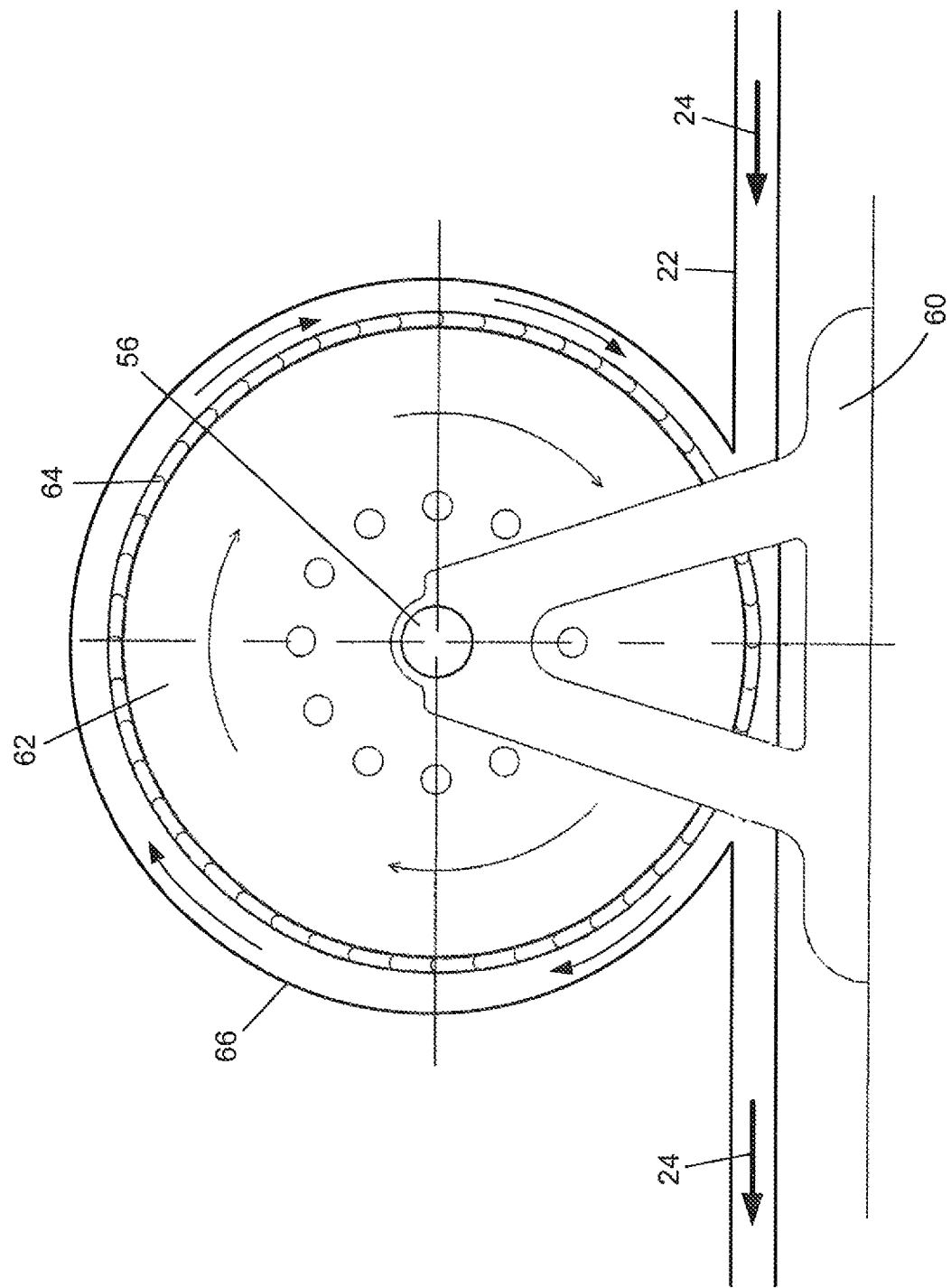
FIG. 5 is an end view of the first end of the generating assembly of FIG. 3 shown with a support structure for supporting the main drive shaft.
Figure 6:
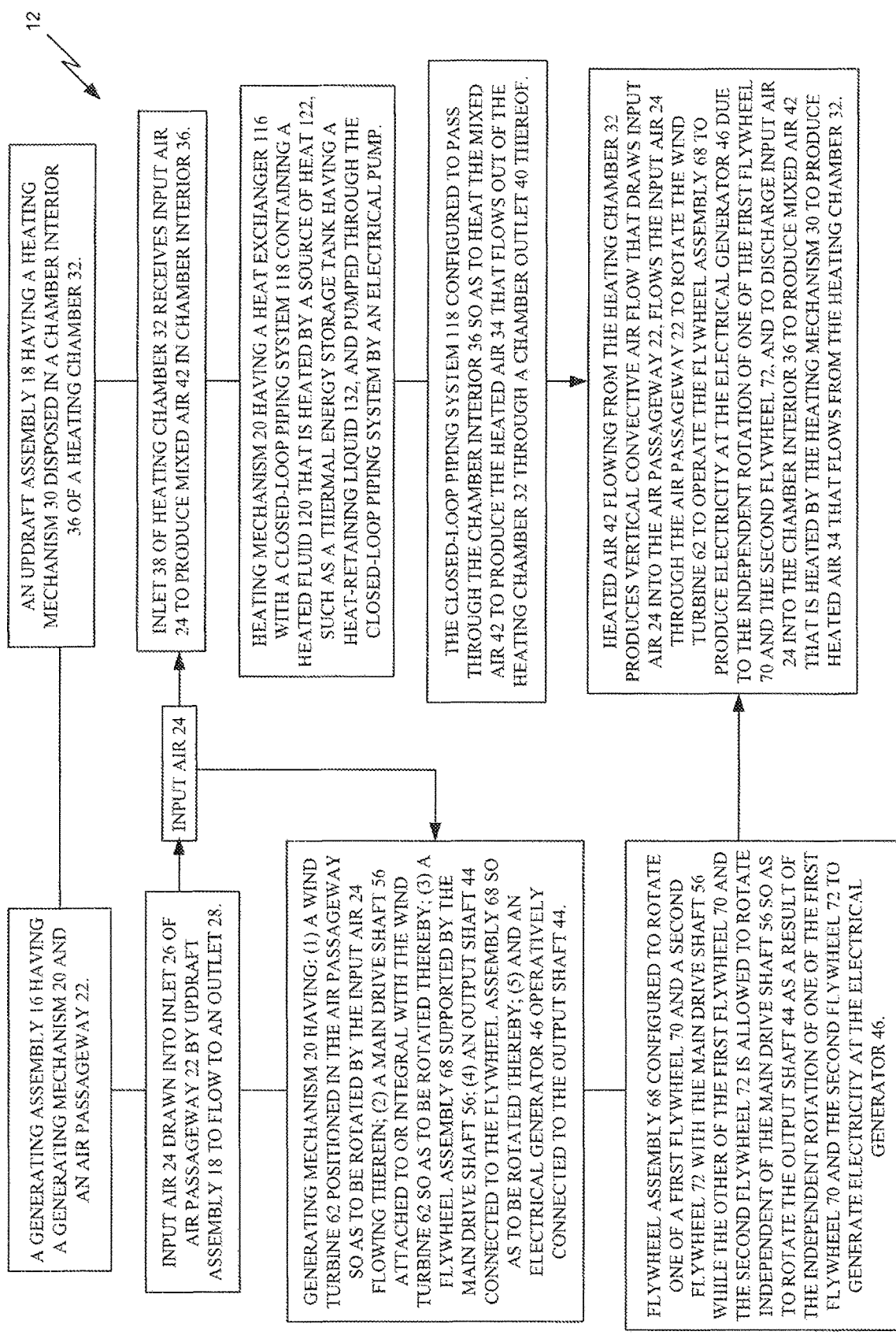
FIG. 6 is a diagram illustrating the system of the present invention to generate electricity.

As shown in FIGS. 1 and 2, the apparatus 10 of the present invention generally comprises a generating assembly 16 and an updraft assembly 18 that are structured and arranged to function together in a manner which will produce rotational torque that is beneficially utilized to generate electricity, as set forth in the charts summarizing the system 12 and method 14 in FIGS. 6 and 7. As set forth in more detail below, the generating assembly 16 comprises a wind-driven generating mechanism 20 that is at least partially disposed inline inside an air passageway 22 that allows input air 24, which may be fresh air, to move between an inlet 26 and an outlet 28 that is connected to the updraft assembly 18, as shown in FIGS. 1, 2 and 5. Input air 24 moves through the air passageway 22 to engage certain components of the wind generating mechanism 20 to produce rotational torque that is utilized to generate electricity. As shown in FIGS. 1 and 2, the updraft assembly 18 comprises a heating mechanism 30 that is disposed in a heating chamber 32 to heat the input air 24 into heated air 34 that is discharged from the updraft assembly 18, as set forth in the charts summarizing the system 12 and method 14 in FIGS. 6 and 7. The heating chamber 32 has a chamber interior 36 between a chamber inlet 38 and a chamber outlet 40 in which will be mixed air 42, made up of a mix of input air 24 and a some amount of heated air 34, as shown in FIGS. 1-2. In general, the heating mechanism 30 heats mixed air 42 in the chamber interior 40 of the heating chamber 32 to produce heated air 34 that, by chimney-like convection, rises out the chamber outlet 40, thereby drawing input air 24 into the air passageway 22 at the passageway inlet 26. The input air 24 flows through the air passageway 22 and engages the generating mechanism 20 to generate electricity as the input air 24 is drawn toward the passageway outlet 28 and chamber inlet 38, which are in fluid flow communication, so as to flow into the chamber interior 36 and become part of the mixed air 42 that is heated by the heating mechanism 30 to become heated air 34 that moves upward to flow out the chamber outlet 40 and draw in more input air 24 into the air passageway 22, as set forth in the charts summarizing, respectively, the system 12 and method 14 of the present invention shown in FIGS. 6 and 7.

As set forth above, the generating assembly 16 has a wind-driven generating mechanism 20 that engages the input air 24 as it flows through the air passageway 22, typically due to being drawn therethrough by the upward flow of the heated air 34 in the updraft assembly 18, to generate electricity by rotating an output shaft 44 that is operatively connected to an electrical generator 46, as shown in FIGS. 3-5. For purposes of describing the embodiment of the generating mechanism 20 shown in the figures, the generating mechanism 20 as a first side 48, a second side 50, a first end 52 and a second end 54, with the generating mechanism 20 having an output shaft 44 extending toward an electrical generator 46 at each of the first side 48 and second side 50, as best shown in FIG. 3. With regard to the generating mechanism 20 of FIG. 3, the generating mechanism 20 further comprises a main drive shaft 56 having one or more, typically a plurality of, shaft bearings 58 that allow the main drive shaft 56 to rotate relative to a support structure 60, shown in FIG. 5, that is configured to support the main drive shaft 56 and, therefore, the generating mechanism 20 in fluid flow communication with the input air 24 that flows through the air passageway 22. Attached to or integral with the main drive shaft 56, toward the first end 52 thereof in FIG. 3, is a wind turbine 62 having a plurality of wind engaging elements 64, such as vanes or the like, that are each structured and arranged to be engaged by the input air 24 that is flowing through the air passageway 22 so as to rotate the wind turbine 62 and, therefore, the main drive shaft 56 relative to the support structure 60. The support structure 60 is sized and configured to rotatably support, with shaft bearings 58, the main drive shaft 56 in a manner which positions, at least, the wind turbine 62 in an enclosing structure 66 that is in fluid flow communication with the air passageway 22 so as to direct the input air 24 toward and against the wind engaging elements 64 of the wind turbine to rotate the wind turbine 62 and, therefore, the main drive shaft 56, as best shown in FIG. 5. In FIG. 5, the input air 24 is rotating the wind turbine 62 in a clockwise direction (as viewed by the reader). The rotating main drive shaft 56 is utilized, via a flywheel assembly 68, to rotate the output shaft 44 in a manner that operates the electrical generator 46 to produce electricity.

The rotation of the main drive shaft 56 by the wind turbine 62 set forth above is utilized to operate a selectively engagable flywheel assembly 68 having a first flywheel 70, a first gear/clutch assembly 71, a second flywheel 72 and a second gear/clutch assembly 73, with each of the gear/clutch assemblies 71/73 having a clutch mechanism and primary gear ring associated therewith, as shown in FIGS. 3-4. More specifically, the first gear/clutch assembly 72 of the first flywheel 70 has a first clutch mechanism 74 that is operatively associated therewith and a first primary gear ring 76 that is attached to or integral with the first flywheel 70 so as to rotate with the first flywheel 70 and, likewise, the second gear/clutch assembly 73 of the second flywheel 72 has a second clutch mechanism 78 that is operatively associated therewith and a second primary gear ring 80 that is attached to or integral with the second flywheel 72 so as to rotate with the second flywheel 72, as best shown in FIG. 3. The first flywheel 70 (with its first primary gear ring 76) and the second flywheel 72 (with its second primary gear ring 80) are both configured to rotate freely, meaning independent of, on the main drive shaft 56. In contrast, both the first clutch mechanism 74 and the second clutch mechanism 78 are attached to or integral with the main drive shaft 56 so as to rotate with the main drive shaft 56. The first clutch mechanism 74 is structured and arranged to selectively engage with or disengage from the first flywheel 70 such that when the first clutch mechanism 74 is in its engaged condition 82 the first flywheel 70 will rotate with the main drive shaft 56 and when the first clutch mechanism 74 is in its disengaged condition 84 the first flywheel 70 will rotate freely or independent of the main drive shaft 56. The second clutch mechanism 78 is structured and arranged to selectively engage with or disengage from the second flywheel 72 such that when the second clutch mechanism 78 is in its engaged condition 86 the second flywheel 72 will rotate with the main drive shaft 56 and when the second clutch mechanism 78 is in its disengaged condition 88 the second flywheel 72 will rotate freely or independent of the main drive shaft 56.

As set forth in more detail below, the free rotation of the flywheels 70/72 after being disengaged by their respective clutch mechanisms 74/78, is utilized to provide kinetic energy which will produce electricity by the rotation of the output shafts 44 at the electrical generators 46, as summarized in the method chart of FIG. 7. As also set forth in more detail below, the flywheel assembly 68 is operated such that one of the two flywheels 70/72 will be rotating freely (e.g., not engaged by its clutch mechanism 74/78) to provide kinetic energy that rotates the output shaft 44 and operates the electrical generator 46 while the other of the two flywheels 70/72 is engaged by its clutch mechanism 74/78 so as to be rotatably driven by the main drive shaft 56. For example, when the first clutch mechanism 74 associated with the first flywheel 70 is in its engaged condition 82, the first flywheel 70 will be rotating with the main drive shaft 56 to buildup kinetic energy while being disconnected (as explained below) from the output shafts 44, and the second clutch mechanism 78 associated with the second flywheel 72 will be in its disengaged condition 88 allowing the second flywheel 72 to freely rotate so as to use its previously built-up kinetic energy to rotate the output shafts 44 and operate the electrical generators 46 to produce electricity. As the second flywheel 72 begins to rotate more slowly due to the dissipation of its kinetic energy, the second clutch mechanism 78 will move to its engaged condition 86 to build-up rotational speed and, therefore, kinetic energy for the second flywheel 72. When the second clutch mechanism 78 is moving to its engaged condition 86, the first clutch mechanism 74 will move to its disengaged condition 84 to allow the first flywheel 70 to freely rotate so as to utilize the built-up kinetic energy to rotate output shafts 44 and operate the electrical generators 46 to produce electricity. As a result, the flywheel assembly 68 is operated such that one of the two flywheels 70/72 is rotating freely as a result of previously built-up kinetic energy while the other of the two flywheels 70/72 will be rotating with the main drive shaft 56 to build up its kinetic energy. As will be readily appreciated by persons skilled in the relevant art, appropriate electronic sensors and engaging/disengaging devices are utilized to engage or disengage the clutch mechanisms 74/78 and to connect or separate the output shafts 44 from the main gear ring 76/80 associated with the first flywheel 70 and second flywheel 72.

To rotate each output shaft 44 so they will operate their respective electrical generators 46 and generate electricity, the flywheel assembly 68 further comprises (for each output shaft 44 and electrical generator 46 combination) a pair of gear drive shafts, shown as first gear drive shaft 90 and second gear drive shaft 92 (each having a first end 94 and second end 96), a secondary gear ring 98 at the first end 94 of each of the first 90 and second 92 gear drive shafts and a gearbox 100 that is operatively connected to the second end 96 of each of the first 90 and second 92 gear drive shafts, as best shown in FIG. 3. The secondary gear rings 98 are fixedly attached to or integral with their respective gear drive shafts 90/92 and are structured and arranged to be rotated by the rotation of the associated main gear ring 76/80, which will rotate the respective gear drive shafts 90/92. The gearbox 100 is structured and arranged to selectively engage one of the gear drive shafts 90/92, specifically the gear drive shaft 90/92 that is associated with the flywheel 70/72 that is rotating freely and, therefore, driving the associated main gear ring 76/80 using kinetic energy. The gearbox 100 is also structured and arranged to convert the rotation of the gear drive shaft 90/92 from (relative to the position in FIG. 3) its "horizontal" configuration to its right angle "vertical" or perpendicular configuration for rotation of the output shaft 44 that is required to operate the electrical generator 46 to produce electricity. Appropriate electronic sensors and engaging/disengaging devices are utilized with the gearbox 100 to engage or disengage the appropriate second ends 96 of the gear drive shafts 90/92 to connect to or separate the drive shafts 90/92 from the output shafts 44 depending on which flywheel 70/72 is freely rotating so the kinetic energy of the freely rotating flywheel 70/72 will be utilized to rotate the output shafts 44 and operate the electrical generators 46 to produce electricity from the apparatus 10. The configuration and use of such sensors and devices are well known to persons who are skilled in the relevant art.

As will also be readily appreciated by persons who are skilled in the art, the dimensions, weights and other factors of the generating mechanism 20 will directly affect the amount of electricity that is produced by the apparatus 10 of the present invention. For instance, the size of the wind turbine 62 and the amount of input air 24 flowing through the air passageway 22 will affect the speed at which the wind turbine 62 will spin and, as a result, the rotational speed of the main drive shaft 56. The size and weight of the flywheels 70/72 will affect the amount of kinetic energy that is stored from the engagement of a clutch mechanism 74/78 with its respective flywheel 70/72 and which is dissipated when the clutch mechanism 74/78 is disengaged from its respective clutch mechanism 74/78. The amount of kinetic energy available from the flywheels 70/72 will affect the rotation of the main gear rings 76/80, secondary gear rings 98 and output shafts 44. The configuration and use of wind turbines having wind engaging elements, clutch mechanisms that engage or disengage from a flywheel, flywheel operation, gear assemblies and gearboxes for converting rotation of the gear drive shafts 90/92 to rotation of the output shaft 44 are generally well known to persons skilled in the relevant art.

As set forth above, an important part of the generating assembly 16 is the air passageway 22 that directs moving air, such as input air 24, that rotates the wind turbine 62 to rotatably drive the main drive shaft 56 which selectively rotates flywheels 70/72 to operate the electrical generators 46 which produce electricity. As also set forth above, the air passageway 22 has an inlet 26 and an outlet 28, with the inlet 26 being in fluid flow communication with a source of air, which may be environmental from the outdoors or an indoor facility, and the outlet 28 being in fluid flow communication with the chamber inlet 38 to allow the inlet air 24 to flow into the chamber interior 36 of heating chamber 32. In a preferred configuration of the present invention, the inlet 26 to the passageway 22 is open to the atmosphere such that the convective vertical air flow of the rising heated air 34 from the updraft assembly 18 will draw input air 24 (i.e., fresh air) into air passageway 22 through the passageway inlet 26. As will be readily appreciated by persons who are skilled in the art, this reduces the need for the costs associated with providing a forced air device or system that discharges flowing air into the air passageway 22. In the embodiment of FIG. 1, the passageway inlet 26 is an commonly utilized air vent 102. In some embodiments, however, it may be beneficial to have a fan or other forced air device 104, as shown in FIG. 2, that is at least utilized to initiate the system 12 of producing electricity, to supplement the air being drawn into the inlet 26 by the updraft assembly 18 as may be needed or desired for efficient operation of the apparatus 10 and system 12 and/or to provide the entirety of the input air 24 that is utilized to rotate the wind turbine 62. The forced air device 104 is connected to the passageway inlet 26, such as the air vent 102, so pressurized air from the forced air device 104 is directed into the air passageway 22, to the wind turbine 62 and to the chamber inlet 38. The configuration and use of forced air fans and other forced air devices 104 are well know to persons who are skilled in the relevant art. Such forced air devices 104 can, depending on the operation thereof, be powered by electricity, gas or other sources of energy.

The air passageway 22 can be provided in a wide variety of different manners that are suitable for delivering the input air 24 to the heating chamber 32. In one embodiment, the air passageway can comprise one or more, typically a plurality of, tubular members 106 that, as shown in FIGS. 1, 2 and 5, connect the inlet 26 to the enclosing structure 66 surrounding the wind turbine 62 so the input air 24 will operatively interact with the wind engaging elements 64, such as vanes or the like, of the wind turbine 62 to rotate the wind turbine 62 and, therefore, the main drive shaft 56, as set forth above. As will be readily appreciated by persons skilled in the art, the one or more tubular members 106 can be pipes or, for the purpose of the present invention, a tunnel that is built through the ground 108 for those systems 12 that position one or more components, such as the generating mechanism 24 and the heating mechanism 30 below the surface 110 of the ground, as shown in FIGS. 1-2. The enclosing structure 66 can be a shroud or be cut out of the ground 108 for below ground surface facilities.

The electricity that is produced by the generating assembly 16 will be delivered to a wide variety of devices and systems that can beneficially use or distribute the electricity. In FIG. 1, the electricity that is produced by the generating assembly 16 is shown as being delivered to a power plant transformer 112 and then electrically directed to a power grid 114 where the electricity is delivered to homes, business and the like. As will be readily understood by persons who are familiar with electricity delivery systems, the electrical generators 46 will be electrically connected to the power plant transformer 112, electrical grid 114 and/or to other devices/systems for use of the electricity or means of transmitting the produced electricity to users thereof.

As set forth above, the updraft assembly 18 has a heating mechanism 30 positioned inside the chamber interior 36 of a heating chamber 32 to heat mixed air 42, which is a typically a combination of input air 24 and partially heated air. The heated air 34 will rise to create a convective vertical air flow that draws in input air 24 at the passageway inlet 26 to the chamber inlet 38, which is in fluid flow connection with the passageway outlet 28, as shown in FIGS. 1-2. In a preferred embodiment, the heating mechanism 30 comprises a heat exchanger 116 having a closed-loop piping system 118 that is structured and arranged to carry a heated fluid 120 that is heated to the desired temperature by a source of heat 122. The closed-loop piping system 118 (which acts as the chamber heating mechanism 30) inside the chamber interior 36 of the heating chamber 32 transfers heat from the heated fluid 120, via a heat transfer effect, to the mixed air 42 inside the chamber interior 36 of the heating chamber 32 to produce the heated air 34 necessary to achieve the desired convective vertical air flow that will draw input air 24 into the inlet 26 of the air passageway 22. In one of the preferred embodiments, the source of heat 122 comprises one or more thermal energy storage tanks 124 and one or more heaters for heating (reheating) the heated fluid 120 as it moves through the closed-loop piping system 118, as shown in FIGS. 1-2. One or more fluid pumps 128, as shown in FIG. 2, are utilized to circulate the heated fluid 120 through the closed-loop piping system 118 as it passes through the thermal energy storage tanks 124, heating mechanism 126 and heating chamber 32. If desired, heater 126 can be an electric or gas powered heater that is placed in the chamber interior 136 of the heating chamber 32 (as shown in FIG. 2) or elsewhere along the path of the closed-loop piping system 118 to provide heat to maintain the desired temperature of the heated fluid 120 in the closed-loop piping system 118. If heater 126 is an electric heater, it can be connected to a source of electricity 130 that is generated, as set forth below, as part of the system 12 of the present invention.

In one configuration, the heated fluid 120 is water. In the preferred embodiments of the present invention, however, the heated fluid 120 is a liquid that is selected to have better heat-retaining properties than water. For instance, the use of a salt bath, oil or like heat-retaining liquids as the liquid that is heated to be utilized as the heated fluid 120 will help the heated fluid 120 stay heated longer and, therefore, be able to more continuously and efficiently deliver the heated fluid 120 to the heating chamber 32 of the updraft assembly 18 for producing the heated air 34 that draws in the input air 24. In one embodiment, the liquid could be a combination of water and calcium oxide (quicklime) and/or magnesium salts. In other embodiments, the liquid could be mineral oil, hydraulic oil, motor oil or the like. These and other suitable liquids are commonly referred to as phase change materials or PCMs. The selection of a particular liquid for use with the system 12 of the present invention to produce electricity will be determined based on factors related to the system 12, such as the location, size and the like. The configuration and use of the "specialized" liquids for the heated fluid 120 that are able to be more easily heated and to better retain heat are generally well known to persons who are skilled in the relevant art.

As shown in FIGS. 1-2, in the preferred embodiments of the present invention, a preferred source of heat 122 is one or more thermal energy storage tanks 124 which, as well known in the art, each comprise an insulated tank having a heat-retaining liquid 132 inside the tank. In some embodiments, the heat-retaining liquid 132 of the thermal energy storage tanks 124 may be the same type of heat-retaining liquid which is utilized for the heated fluid 120. Preferably, the thermal energy storage tank 124 is structured and arranged to maintain the heat-retaining liquid 132 inside the tank at a temperature that is sufficient to heat the heated liquid 120 inside the closed-loop piping system to the desired temperature as the closed-loop piping system 118 passes through the thermal energy storage tank 124, as best shown in FIG. 2. When utilized, the heaters 126 are able, as may be needed or desired, to supplement the heating provided by the thermal energy storage tank 124. In a preferred embodiment of this configuration, a fluid heating mechanism 134 is associated with the thermal energy storage tank 124 and is structured and arranged to heat the heat-retaining liquid 132 in the thermal energy storage tank 124 to the temperature, which may be 1,000° F. or so, to provide sufficient heat to heat the heated fluid 120 in the closed loop piping system 118 and to maintain the heat-retaining liquid 132 at that temperature in a manner which requires as minimal ongoing expenditure of money for electricity, fuel or the like. Although the fluid heating mechanism 134 that heats the heat-retaining liquid 132 can be any of commonly available, standard heating devices and utilize energy produced from non-renewable resources, in a preferred embodiment, the fluid heating mechanism 134 is or utilizes renewable sources of energy to heat the heat-retaining liquid 132 in the thermal energy storage tank 124. For instance, as shown in FIGS. 1-2, the heating mechanism 134 can be connected to one or more solar panels 136 that are associated with the thermal energy storage tank 124 and configured to store electrical energy in a battery system 138, such as one or more lithium-ion batteries or the like, to provide electrical power to the heating mechanism 134. Alternatively, the heating mechanism 134 can comprise a solar collector or other types of solar heat units, such as a Fresnel lens or the like, that are utilized to direct sunlight and/or heated air at the thermal energy storage tank 124 to directly heat the heat-retaining liquid 132 therein. In other embodiments, an electrically powered heating mechanism 134 can be connected, typically via the battery system 138, to one or more above-ground wind turbines 138 or a solar panel array 140, as best shown in FIG. 2. The above-ground wind turbines 140 and/or solar panel array 142 can be the source of electrical power 130 that powers the electric heater 126 associated with the closed-loop piping system 118 (such as electric heater 126 inside the heating chamber 32). The configuration and use of above-ground wind turbines 140, solar panel arrays 142 and the like to produce "clean" electrical energy are well known to persons skilled in the relevant art.

In a preferred embodiment of the system 12 of the present invention, as an alternative to or in addition to using an electric or gas heater as the heating mechanism 134 to heat the heat-retaining liquid 132, the system 12 of the present invention can utilize one or more solar collectors 144 to heat the heat-retaining liquid 132, as shown in FIG. 2. In the embodiment of FIG. 2, the solar collector 144 for the fluid heating mechanism 134 comprises one or more, typically a plurality of, parabolic trough solar collectors that are configured to receive sunlight from the sun and direct condensed focused sunlight towards a tank piping system 146 that is connected to, in a loop manner, to the thermal energy storage tank 124 (as the source of heat 122) to heat and maintain the temperature of the heat-retaining liquid 132 in the thermal energy storage tank 124 that is utilized to heat the heated liquid 120 in the closed-loop piping system 118 as it passes through the thermal energy storage tank 124. As set forth above, the heat of the heat-retaining liquid 132 in the thermal energy storage tank 124 heats/reheats the heated liquid 120 in the closed-loop piping system 118 after the closed-loop piping system 118 has passed through the heating chamber 32, where it has lost heat by heating the mixed air 42 to produce the heated air 34 that draws in input air 24 to the air passageway 22. As will be familiar to persons who are skilled in the relevant art, the "cooled" heat-retaining liquid 132 will be reheated by focused sunlight as the tank piping system 146 passes through the parabolic trough solar collectors 142. The reheated heat-retaining liquid 132 is directed back into the thermal energy storage tank 124. As will be readily appreciated by persons who are skilled in the art, other types of solar heat units, such as a Fresnel lens or the like, can be utilized as solar reflectors 144 to heat the heat-retaining liquid 132 in the tank piping system 146. If desired the system 12 can be configured to connect the tank piping system directly to the closed-loop piping system 118 to utilize heat-retaining liquid 132 as heated fluid 120 in the closed-loop piping system 118 by by-passing the thermal energy storage tanks 124. The configuration and use of parabolic trough solar collectors, Fresnel lenses and the like to heat a fluid passing through a piping system are well known to persons who are skilled in the relevant art.

To facilitate the updraft function of the heating chamber 32, in the preferred embodiments of the apparatus 10 and system 12 of the present invention the chamber outlet 40 is configured to provide a chimney-like effect that will accelerate the convective vertical air flow of the heated air 34. As shown in FIGS. 1-2, the chamber outlet 40 is narrowed by either having the heating chamber 32 have inverted funnel shape (FIG. 1) or an angled upward section. To further facilitate the updraft of heated air 34, the updraft assembly 18 can further comprise an updraft tower 148 having a chimney-like piping 150 that directs the heated air 34 out an exhaust port 152 at or near the top of the updraft tower 148, as shown in FIGS. 1-2. The use of the updraft tower 148, which can be configured in a silo like shape, will allow the heated air 34 to be dispersed to the environment away from the surface 110 of the ground 108. The configuration and use of updraft towers and the like as part of an updraft assembly 18 are generally well known to persons who are skilled in the relevant art.

As shown in FIGS. 1-2, much of the generating assembly 16 and the updraft assembly 18 of the apparatus 10 and system 12 can be built below the surface 110 of the ground 108 to lessen the visual impact on the local area as much as possible. As set forth above, in rural areas the updraft tower 148 can be built to look like a typical silo and a structure 154 can be utilized to house the thermal energy storage tank 124 and other equipment, such as forced air device (fan) 104, battery system 138 and the various control equipment for controlling the operation of the flywheels 70/72 and gearboxes 100 of the generating mechanism 20 of the generating assembly 16. If desired, the structure 154 can be in the shape of a barn or other "farm" building. Likewise, the updraft tower 148 and structure 154 can be configured in a manner so as to blend into locations such as cities, towns and other urban areas.

In one embodiment, the system for generating electricity 12 of the present invention comprises the apparatus 10 described above and the power plant transformer 112, power grid 114, source of electricity 130 and the battery system 138. More specifically, as set forth on FIG. 6, a preferred embodiment of the new system 12 comprises the generating assembly 16 having a generating mechanism 20 and air passageway 22 with a wind turbine 62 that is in fluid flow communication with the air passageway so as to be rotated by input air 24 moving through the air passageway 22 and an updraft assembly 18 having a heating mechanism 30 in a heating chamber 32 to heat mixed air 42 in the chamber interior 36 to flow heated air upward to provide convective vertical air flow that draws the input air 24 into the air passageway 22. As described above, the generating mechanism 20 comprises the wind turbine 62 having a plurality of wind-engaging elements 64 that engage the input air 24 to rotate a main drive shaft 56 which operates a flywheel assembly 68 to produce kinetic energy that rotates an output shaft 44 which is operatively connected to the electric generators 46 that connect to the power plant transformer 112 and electrical grid 114 to deliver electricity to, if desired, thousands of end users.

The flywheel assembly 68 has two separate flywheels 70/72 that are each operatively connected to their own clutch mechanisms 74/78 so that each flywheel 70/72 will selectively move between an engaged condition 82/86 in which the respective flywheel 70/72 is brought up to a desired rotating speed by rotation of main drive shaft 56 and a disengaged condition 84/88 in which the respective flywheel 70/72 rotates freely of the main drive shaft 56, thereby discharging its built-up kinetic energy. A gearbox 100 selectively connects the freely rotating flywheel 70/72 (via main gear rings 76/80, a secondary gear ring 98 and gear drive shafts 90/92) with the output shaft 44 such that only the freely rotating (kinetic energy) flywheel 70/72 will rotate the output shaft 44 and operate the electrical generator 46. When the speed of the freely rotating flywheel 70/72 slows down due to dissipation of its kinetic energy, the respective clutch mechanism 74/78 will engage the slowing down flywheel 70/72 with the rotating main drive shaft 56 to bring the flywheel 70/72 back up to the desired rotational speed. At the same time, the clutch mechanism 74/78 associated with the other flywheel 70/72 will become disengaged from the main drive shaft 56 so its kinetic energy can be used to rotate the output shaft 44 and operate the electrical generator 46. The switching of the flywheels 70/72 between an engaged condition 82/86 and a disengaged condition 84/88 is continuously repeated to produce electricity.

To provide the moving input air 24 to drive the wind turbine 62, the updraft assembly 18 is configured to heat the mixed air 42 in the chamber interior 36 of the heating chamber 32 and allow the heated air 34 to flow upward out the chamber outlet 40 to produce the convective vertical air flow that draws input air 24 into the air passageway 22. A heat source 122 heats a heated fluid 120 flowing through a closed-loop piping system 118 that passes through the chamber interior 36 of the heating chamber 32 to heat the mixed air 42, which is a combination of input air 24 from the air passageway 22 and previously heated air, to produce the heated air 34 that rises out of the heating chamber 32 to draw in the input air 24 into the air passageway 22. Preferably, the heat source 122 comprise a thermal energy storage tank 124 having a heat-retaining liquid 132 therein and the closed-loop piping system 118 passes through the thermal energy storage tank 124 so the heated fluid 120 can be heated by the heat-retaining liquid 132. The heat-retaining liquid 132 is heated by one or more fluid heating mechanisms 134 associated with the thermal energy storage tank 124. In a preferred embodiment, one or more solar collectors 144 are utilized, vie a tank piping system 146, to heat/reheat the heat-retaining liquid 132 that is stored in the thermal energy storage tank 124. In other embodiments, the fluid heating mechanism 134 comprises solar panels 136, Fresnel lenses and/or one or more heaters 126 to heat the heated fluid 120 flowing in the closed-loop piping system 118. A pump 128 is utilized to move the heated fluid 120 through the closed-loop piping system 118. A source of electricity 130, which can be above-ground wind turbines 140, a solar panel array 142 and the like, are utilized to power the heaters 126 an pump 128. A battery system 138 can store energy for times of low wind or solar output. If desired, an updraft tower 148 is utilized to facilitate outflow of the heated air 34.

A method 14 of produce electricity using the generating assembly 16 and updraft assembly 18 described above is shown in FIG. 7. In general, the new method 14 comprises the steps of: (1) providing a generating assembly 16 having a generating mechanism 20 and air passageway 22 and an updraft assembly 18 having a heating mechanism 30 with a heat exchanger 116 disposed inside the chamber interior 36 of a heating chamber 32 to heat mixed air 42 so that heated air 34 will rise upward producing a convective force that draws in input air 24 into the air passageway 22, with the heat exchanger comprising a heated fluid 120 flowing in a closed-loop piping system 118; (2) heating the heated fluid 120 in the closed-loop piping system 118 with the a source of heat 122, which in the preferred embodiment is the thermal energy storage tank 124; (3) flowing the heated fluid 20 in the closed-loop piping system 118 through the chamber interior 36 of the heating chamber 32 to heat the mixed air 42 therein to produce heated air 34; (4) flowing the heated air 34 out of the heating chamber 32 to draw input air 24 into the air passageway 22; (5) rotating a wind turbine 62 of the generating mechanism 20 with the input air 24 to rotate a main drive shaft 56 attached to or integral with the wind turbine 62; (6) operating a flywheel assembly 68 to selectively engage and rotate one flywheel 70/72 with its associated clutch mechanism 74/78 to rotate the flywheel 70/72 with the rotating main drive shaft 56 in order to build-up kinetic energy in that flywheel 70/72; (7) disengaging the rotating flywheel 70/72 to allow the kinetic energy associated therewith to rotate an output shaft 44, via a gearbox 100 that is connected to an associated gear assembly 76/80/98 and gear drive shaft 90/92, that is operatively connected to an electrical generator 46 to produce electricity while the other flywheel is engaged with its associated clutch mechanism 74/78 to rotate with the main drive shaft 56 and build-up kinetic energy for that flywheel 70/72; (8) repeating step 7 for the two flywheels 70/72 such that one flywheel 70/72 is freely rotating to discharge its kinetic energy and produce electricity while the other flywheel 70/72 is being brought up to its desired rotating speed by being engaged with its clutch mechanism 74/78 to rotate with the main drive shaft 56, which is be rotated by the flowing input air in the air passageway; and (9) directing the electricity produced by the electrical generator 46 to a power plant transformer 112 for distribution in a power grid 114.

As will be readily understood and appreciated by persons who are skilled in the relevant art, the various components of the apparatus 10, system 12 and method 14 of the present invention can be made out of a wide range of materials and in different sizes and configurations, as may be desirable, to achieve the benefits of the present invention at a desired level of electricity production. For instance, in one configuration, the heat-retaining liquid 132 in the thermal energy storage tank 124 can be heated to a temperature of 1000° F. and the tank thereof can be sized to hold 20,000 gallons. One or more solar collectors 144 or other fluid heating mechanisms 134 can be utilized to heat and maintain the heat of the heat-retaining liquid 132. The heating chamber 32 can be built underground and have a fireplace-shaped chamber interior 36 of 10,000 cubic feet with the closed-loop piping system 118 of the heat exchanger 116 beneficially positioned in the chamber interior 36 to heat the mixed air 42 therein to be heated air 34 that flows upward and out the chamber outlet 40 to produce the convective vertical air flow that will draw the input air 24 into the air passageway 22. The air passageway 22 can be a twenty-four inch diameter pipe that directs input air to the enclosed wind turbine 62, which can be a paddlewheel-shaped twenty food diameter wind turbine. After the input air 24 spins the wind turbine 24, the twenty-four inch diameter pipe can deliver the input air 24 to the heating chamber 32 to produce the mixed air 42 that is heated by the heat exchanger 116 to become heated air 34. As heated air 34 rises, it will expand and rise upward and out the chamber outlet 40 and up the updraft tower 148, which can be a one hundred feet high "chimney" that provides the stack or chimney effect that draws in the input air 24. If desired, a forced air device 104, such as an electric fan, can be located at the passageway inlet 26, or elsewhere in the system 14, to force air into the air passageway 22 for rotating the wind turbine 62 between sixty and one hundred twenty RPM to operate the flywheel assembly 68 to produce electricity using two or more three megawatt electrical generators 46. The flywheels 70/72 of the flywheel assembly 68 can be twenty feet in diameter and weigh ten tons. In a preferred embodiment, the new apparatus 10 and system 12 are configured to operate at load for basically 24/7 electricity production, with shutdowns only for periodic maintenance. As shown in FIG. 1, the system 12 can include an elevator 156 that allows a person to access the facilities below the surface 110 of the ground and a control building 158, which may be powered by solar panels thereon, that is utilized to house the computer systems and personnel who operate the components of the apparatus 10 and system 12. The above is merely exemplary of the sizes and configurations of the components of the present invention and, therefore, are not intended to be limiting in any manner with regard to possible configurations of the present invention.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. An apparatus for generating electricity, said apparatus comprising:
 a generating assembly having a generating mechanism and an air passageway, said air passageway configured to receive input air at a passageway inlet and to flow said input air through said air passageway so as to discharge said input air therefrom at a passageway outlet, said generating mechanism having a wind turbine positioned in said air passageway so as to be rotated by said input air flowing therein, a main drive shaft attached to or integral with said wind turbine so as to be rotated thereby, a flywheel assembly supported by said main drive shaft, an output shaft connected to said flywheel assembly so as to be rotated thereby and an electrical generator operatively connected to said output shaft, said flywheel assembly structured and arranged to engagedly rotate one of a first flywheel and a second flywheel with said main drive shaft while the other of said first flywheel and said second flywheel is allowed to rotate independent of said main drive shaft, said flywheel assembly further structured and arranged to rotate said output shaft as a result of the independent rotation of one of said first flywheel and said second flywheel so as to generate electricity at said electrical generator; and
 an updraft assembly having a heating chamber and a heating mechanism disposed in a chamber interior of said heating chamber, said heating chamber having a chamber inlet in fluid flow communication with said passageway outlet so as to receive input air into said chamber interior to produce mixed air therein, said heating mechanism structured and arranged to heat said mixed air in said chamber interior so as to produce heated air that will flow out of said heating chamber through a chamber outlet thereof, wherein heated air flowing from said heating chamber will produce vertical convective air flow that will draw input air into said air passageway at said passageway input, flow said input air through said air passageway to rotate said wind turbine to operate said flywheel assembly so as to produce electricity at said electrical generator due to the independent rotation of one of said first flywheel and said second flywheel and to discharge said input air into said chamber interior to produce mixed air that is heated by said heating mechanism to produce heated air that flows from said heating chamber.

2. The apparatus of claim 1 further comprising a forced air device at said passageway inlet to direct said input air into said air passageway.

3. The apparatus of claim 1, wherein said flywheel assembly further comprises a first gear/clutch assembly associated with said first flywheel, a second gear/clutch assembly associated with said second flywheel and a gearbox that is structured and arranged to interconnect said first gear/clutch assembly and said second gear/clutch assembly with said output shaft, said first gear/clutch assembly being structured and arranged to selectively place said first flywheel in an engaged condition to rotate said first flywheel with said main drive shaft and a disengaged condition to allow said first flywheel to rotate independently of said main drive shaft, said second gear/clutch assembly being structured and arranged to selectively place said second flywheel in an engaged condition to rotate said second flywheel with said main drive shaft and a disengaged condition to allow said second flywheel to rotate independently of said main drive shaft, said gearbox structured and arranged to rotate said output shaft when one of said first flywheel is in said disengaged condition and said second flywheel is in said disengaged condition.

4. The apparatus of claim 3, wherein said first gear/clutch assembly has a first clutch mechanism operatively associated with said first flywheel so as to place said first flywheel in one of said engaged condition and said disengaged condition, a first main gear ring attached to or integral with said first flywheel so as to rotate therewith, a secondary gear ring in engagement relation with said first main gear ring and a first gear drive shaft attached to or integral with said secondary gear ring, said second gear/clutch assembly has a second clutch mechanism operatively associated with said second flywheel so as to place said second flywheel in one of said engaged condition and said disengaged condition, a second main gear ring attached to or integral with said second flywheel so as to rotate therewith, a secondary gear ring in engagement relation with said second main gear ring and a second gear drive shaft attached to or integral with said secondary gear ring, each of said of said first gear drive shaft and said second gear drive shaft operatively connected to said gearbox.

5. The apparatus of claim 1, wherein said apparatus has a plurality of said output shafts connected to said flywheel assembly, each of said output shafts operatively connected to an electrical generator so as to produce electricity.

6. The apparatus of claim 1, wherein said heating mechanism comprises a heat exchanger having a closed-loop piping system containing a heated fluid that is heated by a source of heat, said closed-loop piping system configured to heat said mixed air in said chamber interior to produce said heated air.

7. The apparatus of claim 6, wherein said source of heat comprises at least one of a thermal energy storage tank and a heater, said thermal energy storage tank containing a heat-retaining liquid that is heated by fluid heating mechanism.

8. The apparatus of claim 7, wherein said heat-retaining liquid is selected to heat said heated fluid as said closed-loop piping system passes through said thermal energy storage tank.

9. The apparatus of claim 7, wherein said fluid heating mechanism comprises at least one of one or more solar panels associated with said thermal energy storage tank and one or more solar collectors in fluid flow communication with said heat-retaining liquid in said thermal energy storage tank.

10. The apparatus of claim 9 further comprising a tank piping system configured to flow said heat-retaining liquid from said one or more solar collectors for heating and to return said heat-retaining liquid to said thermal energy storage tank.

11. The apparatus of claim 1, wherein said updraft assembly further comprises an updraft tower at said chamber outlet, said updraft tower having a chimney-like piping configured to transfer heated air from said chamber outlet to an exhaust port associated with said updraft tower.

12. A system for generating electricity, said system comprising:
a generating assembly having a generating mechanism and an air passageway, said air passageway configured to receive input air at a passageway inlet and to flow said input air through said air passageway so as to discharge said input air therefrom at a passageway outlet, said generating mechanism having a wind turbine positioned in said air passageway so as to be rotated by said input air flowing therein, a main drive shaft attached to or integral with said wind turbine so as to be rotated thereby, a flywheel assembly supported by said main drive shaft, an output shaft connected to said flywheel assembly so as to be rotated thereby and an electrical generator operatively connected to said output shaft, said flywheel assembly structured and arranged to engagedly rotate one of a first flywheel and a second flywheel with said main drive shaft while the other of said first flywheel and said second flywheel is allowed to rotate independent of said main drive shaft, said flywheel assembly further structured and arranged to rotate said output shaft as a result of the independent rotation of one of said first flywheel and said second flywheel so as to generate electricity at said electrical generator;
an updraft assembly having a heating chamber and a heating mechanism disposed in a chamber interior of said heating chamber, said heating chamber having a chamber inlet in fluid flow communication with said passageway outlet so as to receive input air into said chamber interior to produce mixed air therein, said heating mechanism having a heat exchanger with a closed-loop piping system containing a heated fluid that is heated by a source of heat, said closed-loop piping system configured to pass through said chamber interior so as to heat said mixed air to produce said heated air that will flow out of said heating chamber through a chamber outlet thereof;
a pump electrically connected to a source of electricity, said pump configured to pump said heated fluid through said closed-loop piping system; and
at least one of a power plant transformer and a power grid electrically connected to said electrical generator, wherein heated air flowing from said heating chamber will produce vertical convective air flow that will draw input air into said air passageway at said passageway input, flow said input air through said air passageway to rotate said wind turbine to operate said flywheel assembly so as to produce electricity at said electrical generator due to the independent rotation of one of said first flywheel and said second flywheel and to discharge said input air into said chamber interior to produce mixed air that is heated by said heating mechanism to produce heated air that flows from said heating chamber.

13. The system of claim 12 further comprising a forced air device at said passageway inlet, said forced air device configured to direct said input air into said air passageway.

14. The system of claim 12, wherein said flywheel assembly further comprises a first gear/clutch assembly associated with said first flywheel, a second gear/clutch assembly associated with said second flywheel and a gearbox that is structured and arranged to interconnect said first gear/clutch assembly and said second gear/clutch assembly with said output shaft, said first gear/clutch assembly structured and arranged to selectively place said first flywheel in an engaged condition to rotate said first flywheel with said main drive shaft and a disengaged condition to allow said first flywheel to rotate independently of said main drive shaft and to selectively place said second flywheel in an engaged condition to rotate said second flywheel with said main drive shaft and a disengaged condition to allow said second flywheel to rotate independently of said main drive shaft, said gearbox structured and arranged to rotate said output shaft when one of said first flywheel is in said disengaged condition and said second flywheel is in said disengaged condition.

15. The system of claim 14, wherein said first gear/clutch assembly has a first clutch mechanism operatively associated with said first flywheel so as to place said first flywheel in one of said engaged condition and said disengaged condition, a first main gear ring attached to or integral with said first flywheel so as to rotate therewith, a secondary gear ring in engagement relation with said first main gear ring, a first gear drive shaft attached to or integral with said secondary gear ring and said second gear/clutch assembly has a second clutch mechanism operatively associated with said second flywheel so as to place said second flywheel in one of said engaged condition and said disengaged condition, a second main gear ring attached to or integral with said second flywheel so as to rotate therewith, a secondary gear ring in engagement relation with said second main gear ring, a second gear drive shaft attached to or integral with said secondary gear ring, each of said of said first gear drive shaft and said second gear drive shaft operatively connected to said gearbox.

16. The system of claim 12, wherein said source of heat comprises at least one of a thermal energy storage tank containing a heat-retaining liquid and a heater electrically connected to said source of electricity, said heat-retaining liquid heated by a fluid heating mechanism, said heat-retaining liquid selected to heat said heated fluid as said closed-loop piping system passes through said thermal energy storage tank.

17. The system of claim 16, wherein said fluid heating mechanism comprises at least one of one or more solar panels associated with said thermal energy storage tank and one or more solar collectors in fluid flow communication with said heat-retaining liquid in said thermal energy storage tank.

18. A method for generating electricity, said method comprising the steps of:
(a) providing a generating assembly and an updraft assembly, said generating assembly having a generating mechanism and an air passageway through which flows input air, said generating mechanism having a wind turbine, a main drive shaft, a flywheel assembly, an output shaft connected to said flywheel assembly and an electrical generator operatively connected to said output shaft, said flywheel assembly having a first flywheel, a first gear/clutch assembly associated with said first flywheel, a second flywheel, a second gear/clutch assembly associated with said second flywheel and a gearbox that is structured and arranged to interconnect said first gear/clutch assembly and said second gear/clutch assembly with said output shaft, said updraft assembly having a heating mechanism with a heat exchanger disposed inside a chamber interior of a heating chamber, said heat exchanger comprising a heated fluid flowing in a closed-loop piping system;
(b) heating said heated fluid in said closed-loop piping system with a source of heat;
(c) flowing said heated fluid in said closed-loop piping system through said chamber interior of said heating chamber to heat mixed air in said chamber interior to produce heated air that flows upward to produce a convective force which draws in input air into said air passageway;
(d) rotating said wind turbine of said generating mechanism with said input air flowing in said air passageway to rotate said main drive shaft attached to or integral with said wind turbine;
(e) engaging said first flywheel with said first gear/clutch assembly to place said first flywheel in an engaged condition and to be operatively disconnected from said output shaft so as to rotate said first flywheel with said main drive shaft to build up kinetic energy in said first flywheel while said second flywheel is in a disengaged condition and operatively connected to said output shaft with said second gear/clutch assembly allowing said second flywheel to rotate independent of said main drive shaft so as to utilize kinetic energy of said second flywheel to rotate said output shaft to produce electricity at said electrical generator; and
(f) operating said first gear/clutch assembly to place said first flywheel in a disengaged condition and to be operatively connected to said output shaft to allow said first flywheel to rotate independent from said main drive shaft such that kinetic energy associated with rotation of said first flywheel will rotate said output shaft to produce electricity at said electrical generator while operating said second gear/clutch assembly to place said second flywheel in an engaged condition and to be operatively disconnected from said output shaft so as to rotate said second flywheel with said main drive shaft to build-up kinetic energy in said second flywheel.

19. The method of claim 18, wherein said first gear/clutch assembly has a first clutch mechanism operatively associated with said first flywheel so as to place said first flywheel in one of said engaged condition and said disengaged condition, a first main gear ring attached to or integral with said first flywheel so as to rotate therewith, a secondary gear ring in engagement relation with said first main gear ring, a first gear drive shaft attached to or integral with said secondary gear ring and said second gear/clutch assembly has a second clutch mechanism operatively associated with said second flywheel so as to place said second flywheel in one of said engaged condition and said disengaged condition, a second main gear ring attached to or integral with said second flywheel so as to rotate therewith, a secondary gear ring in engagement relation with said second main gear ring, a second gear drive shaft attached to or integral with said secondary gear ring, each of said of said first gear drive shaft and said second gear drive shaft operatively connected to said gearbox.

20. The method of claim 18, wherein said source of heat comprises at least one of a thermal energy storage tank containing a heat-retaining liquid and a heater electrically connected to said source of electricity, said heat-retaining liquid heated by a fluid heating mechanism, said heat-retaining liquid selected to heat said heated fluid as said closed-loop piping system passes through said thermal energy storage tank.

\* \* \* \* \*